(12) United States Patent
Forristal (10) Patent No.: US 9,081,954 B2
(45) Date of Patent: Jul. 14, 2015

(54) VERIFYING FIRMWARE INTEGRITY OF A DEVICE

(75) Inventor: Jeff B. Forristal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 13/992,371

(22) PCT Filed: Sep. 7, 2011

(86) PCT No.: PCT/US2011/050610
§ 371 (c)(1),
(2), (4) Date: Jun. 7, 2013

(87) PCT Pub. No.: WO2013/036223
PCT Pub. Date: Mar. 14, 2013

(65) Prior Publication Data
US 2013/0263262 A1     Oct. 3, 2013

(51) Int. Cl.
*G06F 21/50*     (2013.01)
*G06F 11/30*     (2006.01)
*G06F 21/57*     (2013.01)

(52) U.S. Cl.
CPC ............ *G06F 21/50* (2013.01); *G06F 11/3024* (2013.01); *G06F 11/3031* (2013.01); *G06F 11/3041* (2013.01); *G06F 11/3055* (2013.01); *G06F 21/57* (2013.01)

(58) Field of Classification Search
CPC ....... G06F 21/577; G06F 21/56; G06F 21/57; G06F 21/572
See application file for complete search history.

(56) References Cited

U.S. PATENT DOCUMENTS

| | | |
|---|---|---|
| 8,516,551 B2 | 8/2013 | Smith et al. |
| 2006/0236125 A1 | 10/2006 | Sahita et al. |
| 2007/0192611 A1 | 8/2007 | Datta et al. |
| 2008/0244292 A1 | 10/2008 | Kumar et al. |
| 2009/0132837 A1 | 5/2009 | Kumar |
| 2009/0144825 A1* | 6/2009 | Schluessler et al. ............ 726/23 |
| 2009/0172438 A1 | 7/2009 | Kumar et al. |
| 2009/0172639 A1 | 7/2009 | Natu et al. |
| 2010/0131732 A1 | 5/2010 | Busser et al. |
| 2011/0145598 A1 | 6/2011 | Smith et al. |

OTHER PUBLICATIONS

Intel Trusted Execution Technology Architectural Overview, 2003, 8 pages.
International Searching Authority, "Notification of Transmittal of the International Search Report and the Written Opinion of the International Searching Authority," mailed Apr. 13, 2012, in International application No. PCT/US2011/050610.

* cited by examiner

*Primary Examiner* — Izunna Okeke
(74) *Attorney, Agent, or Firm* — Trop, Pruner & Hu, P.C.

(57) ABSTRACT

In one embodiment, the present invention includes a method for receiving an integrity request in a device of a computer system from a software entity external to the device, performing a measurement of firmware of the device using an integrity measurement logic of the device, analyzing a plurality of pointer structures of the device to determine whether a potential security violation exists, and sending the measurement and a status report regarding the analysis to the software entity. Other embodiments are described and claimed.

16 Claims, 5 Drawing Sheets

VERIFYING FIRMWARE INTEGRITY OF A DEVICE

BACKGROUND

Modern computer systems, both personal computer (PC)-based as well as newer form factors such as tablet computers, netbooks, mobile Internet devices and so forth typically include multiple semiconductor components, including various types of processing circuitry, memories, graphics processing and so forth. In addition, over time many semiconductor components such as processors and certain components have incorporated much functionality that used to be handled by discrete devices. For example, various peripheral functionality such as interrupt control, network interfacing, interface circuitry such as chipsets, memory controller functionality, and so forth can often now be implemented in a single semiconductor component, e.g., within a multicore processor.

In addition, a given computer system can have various hardware devices such as other semiconductor components that are present within the system via add-in cards such as advanced graphics processing cards, networking cards, and other peripheral devices. As a result, these various components, both external and internal to semiconductor devices can include their own processing circuitry such as microcontrollers or so forth to execute intended operations according to a firmware or other supervisory software. This firmware is generally not accessible to security monitoring software such as antivirus software. As a result, malicious software can persist as firmware within such hardware devices, out of sight of security monitoring software. Accordingly, it is possible for certain threats to compromise a computer system via such firmware.

Typically, it is simply assumed that the executing firmware has not been compromised or otherwise changed from what was originally loaded/bootstrapped into the microcontroller. If there is ever any runtime concern that the firmware could have been changed, then the typical practice is to perform a device reset to cause the microcontroller to flush the current executing firmware and reload the bootstrap image.

DETAILED DESCRIPTION

In various embodiments, a hardware device can expose a mechanism to an external monitoring agent, e.g., external software (external to the device), that enables the monitoring agent to reliably inquire as to the integrity of firmware executing within the hardware device. In this way, external security monitoring software such as antivirus software can be used to detect integrity violations or compromises of hardware devices in the computing ecosystem. Note that a wide variety of hardware devices can be integrity verified using embodiments described herein. As examples for purposes of illustration but not limitation, hardware devices can be any manner of hardware present within a PC or other computer ecosystem that includes a programmable controller. Such devices can be by way of add-in card, peripheral devices coupled to a chipset of the system, chipset components, a central processing unit (CPU) or other such devices or portions thereof.

Figure 1:
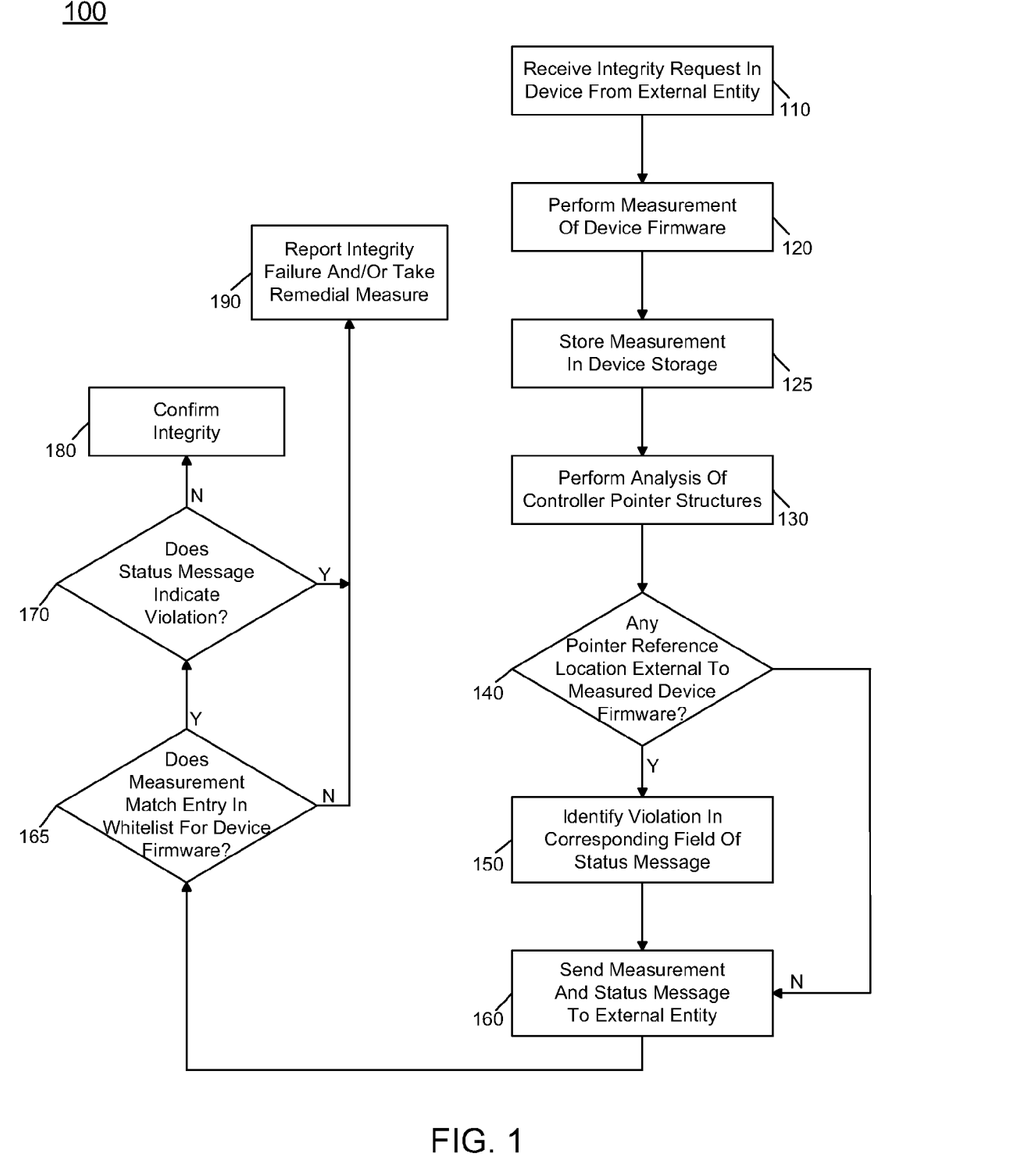
FIG. 1 is a flow diagram of a method for performing an integrity evaluation in accordance with an embodiment of the present invention.

Referring now to FIG. 1, shown is a flow diagram of a method for performing an integrity evaluation in accordance with an embodiment of the present invention. As shown in FIG. 1, method 100 may be implemented within hardware of a device having firmware or other software that is to be integrity checked. Firmware includes routines that are stored in volatile or non-volatile memory structures, such as random access memories (RAMs), read only memories (ROMs), flash memories, and the like and that provide supervisory control of a programmable logic such as a processor or microcontroller. As used herein, the term "firmware" is intended to include operating software and/or supervisory software or other software that executes within a device controller to which entities outside the device have no visibility. In addition, method 100 may further be executed, in part, via an external entity such as integrity software, e.g., antivirus software, present in the computer system or remotely accessible to the computer system via a network. In other embodiments, in addition to the hardware support for performing integrity checking it is possible that a segregated code section, e.g., of the firmware itself can be used to perform at least a portion of the integrity analysis. That is, in embodiments without a dedicated integrity logic, a microcontroller of the device can be placed into a partial trusted state temporarily in which it executes integrity software stored in a ROM. Note that this integrity software or measurement code is partitioned. After execution of the measurement code, the measurement information is recorded, and the microcontroller returns to the untrusted state.

As seen in FIG. 1, method 100 may begin by receiving an integrity request in a device from an external entity (block 110). For purposes of discussion herein, assume the external entity is antivirus software executing on a processor of the system that seeks to test the integrity of firmware of the device which, for purposes of discussion herein can be assumed to be an add-in card having a microcontroller. Thus this request may be received by the microcontroller.

Responsive to the request, dedicated integrity verification logic of the device can perform a measurement of the firmware (block 120). In various embodiments the measurement can be a cryptographic measurement such as a hash of one or more images (e.g., device firmware and/or other controller code) to be executed by one or more programmable controllers of the device. In different implementations, a manifest containing actual hashes of the images can be hashed, or the images themselves can be hashed directly. Such hashes can be computed using an embedded hashing function (such as secure hash algorithm 1 (Sha1), Sha2, or advanced encryption standard hash-based message authentication code (HMAC), cipher message authentication code (CMAC), etc.) of the integrity verification logic. Next, the measurement can be stored in a device storage (block 125). In some embodiments, this device storage may be a secure storage such as a register within or accessible only to the integrity verification logic. However, in other embodiments this measurement can be stored in another location such as static random access memory (SRAM) of the device.

In addition to this firmware measurement, the integrity verification logic can further perform an analysis of controller pointer structures (block 130). As will be described further below, in various embodiments these pointer structures can include an instruction pointer, an interrupt pointer and an exception handling pointer. Each of these structures can be examined to determine whether they point to corresponding locations within the firmware or other code that was subject to the measurement above at block 120. If a pointer does point to a location outside of the measured code, this may be a path for an attacker to tamper, not by changing code, but adding new code that is outside of the measured code block, and changing the pointer to redirect control to such potentially malicious code. Note that this non-firmware pointing reference may not be an actual violation, but it is an indication that a potential security violation is present and can be used to compromise the system. Thus it can be determined at diamond 140 responsive to this analysis whether any pointer references a location external to the measured device firmware. If so, control passes to block 150 where a violation can be indicated, e.g., by identifying the violation in a corresponding field of a status message. From both of diamond 140 and block 150, control passes to block 160 where the measurement and the status message can be sent to the external entity. Note that this report of information to the external entity does not expose secrets or sensitive information as to what is actually running on the device. That is, the information provided may not be an actual identification of the firmware code, but a measurement of the code in a manner that does not include an identity of the code (or include any of the code itself).

From this point forward in the process of method 100, the actions can be performed by or under control of the external entity. First at diamond 165 it can be determined whether the measurement matches an entry in a whitelist for the device firmware. That is, the external entity may include or can access a data structure having various entries, each corresponding to a measured value for an authorized piece of code, such as the firmware for various devices present in the computer system. Or, this whitelist can be externally located from the computer system and accessible to the external entity. The whitelist can be supplied by a vendor, or it can be dynamically generated during runtime as a given device is executed for the first time. If it is determined that the measurement does not match, control passes directly to block 190 where an integrity failure report can be provided, e.g., to a user of the system, and/or remedial measures may be taken. Although the scope of the present invention is not limited in this regard, in various implementations such remedial measures may include shutting down the system, reloading the firmware in question or another operation such as signaling to other hardware or software entities that the system is in an untrusted state. This can enable other entities to react accordingly (e.g., refuse to execute security-sensitive operations). Note that in other embodiments instead of sending a report, a log entry can be generated, which can be sent to a predetermined location.

Otherwise, if the measurement matches at diamond 165, control passes to diamond 170 where it can be determined whether the status message indicates a violation. If not, control passes to block 180, where the integrity can be confirmed, e.g., via a report to a user or another location or by enabling further execution of the device or in another manner. If instead the status message indicates a violation, control passes to block 190 discussed above. Although shown with this particular implementation in the embodiment of FIG. 1, understand the scope of the present invention is not limited in this regard.

Figure 2:
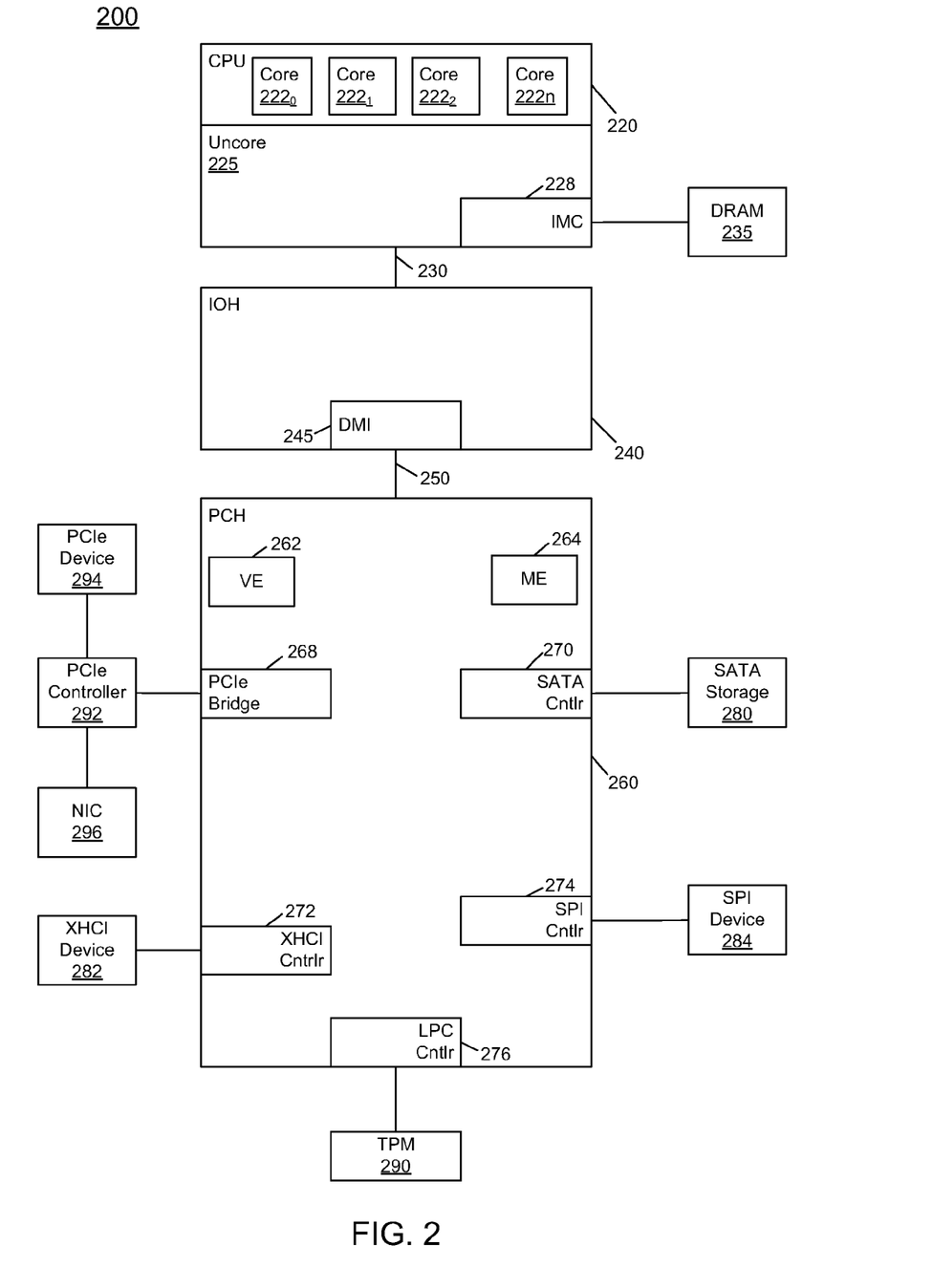
FIG. 2 is a block diagram of a system in accordance with an embodiment of the present invention.

As mentioned above, integrity verifications in accordance with an embodiment of the present invention can be applicable to many different types of computing systems. Referring now to FIG. 2, shown is a block diagram of a system in accordance with an embodiment of the present invention. Note that system 200 may be any type of computer system such as server computer, desktop computer, laptop computer, tablet, netbook computer, mobile Internet device, smart phone, or so forth. For purposes of illustration, in FIG. 2, system 200 may be a Peripheral Component Interconnect Express (PCI Express™ (PCIe™))-based system in which various components are coupled via various interconnects. Such system may be in accordance with the PCIe™ Base Specification version 2.0 (published Jan. 17, 2007). Specifically in the embodiment of FIG. 2, a processor 220 is coupled via a bus 230 to an input/output hub (IOH) 240, which in turn couples to a peripheral controller hub (PCH) 260 via a bus 250. In turn, PCH 260 may be coupled to a trusted platform module (TPM) 290 and other devices. As seen, each of these components may include various internal devices and can further be coupled to one or more other devices. Each such device may include or may be associated with a PCI configuration space, which may be a portion of a local memory that can include configuration information. In various embodiments, such configuration spaces may further include an integrity reporting construct in accordance with an embodiment of the present invention.

As seen in FIG. 2, processor 220 may include a plurality of cores $222_{0-n}$ to execute instructions of one or more threads. In addition, processor 220 may further include an uncore 225 which may include various system agent logic of the processor that executes outside of the processor cores. In addition, processor 220 may further include an integrated memory controller (IMC) 228 that may couple to a system memory 235, which in the embodiment shown in FIG. 2 may be a dynamic random access memory (DRAM). As further seen in the embodiment of FIG. 2, IOH 240 may also include a bridge 245 which may be in accordance with a direct media interface (DMI) protocol.

As further shown in FIG. 2, PCH 260 may include various components including bridges and controllers. In addition, a virtualization engine (VE) 262 and a manageability engine (ME) 264 may be present to provide control functions for various peripheral devices. As seen, PCH 260 may further include controllers and bridges 268, 270, 272, 274, and 276 to provide various functionality and to interface with various devices coupled to the PCH. Specifically, a PCIe™ bridge 268 may be present, along with controllers including a serial advanced technology attach (SATA) controller 270, an extensible host controller interface (XHCI) controller 272, a low pin count (LPC) controller 276 and a serial peripheral interface (SPI) controller 274, among others. In some embodiments, additional components with the PCH may include sensors and special purpose devices. For purposes of example, FIG. 2 further shows various devices that can be coupled to these different controllers and bridges. Specifically, a SATA storage 280 such as a disk drive or other mass storage can be coupled to SATA controller 270, an XHCI device 282 can be coupled to XCHCI controller 272, and a SPI device 284 can couple to SPI controller 274.

Various devices can be coupled to a PCIe™ controller 292 that in turn couples to PCIe™ bridge 268. In the example shown in FIG. 2, such devices may include a network interface controller (NIC) 296 to enable communication between system 200 and other agents of a network such as a wired network, e.g., a local area network (LAN), a wireless network such as a wireless LAN (WLAN), or a wide-range wireless network such as a cellular network. In addition, a PCIe™ device 294 can also be coupled to the PCIe™ controller. In other embodiments, an IOH may not be present, and instead processor 220 may directly couple to PCH 250 via a DMI or other such interconnect.

The bridges, controllers, and devices can have loadable firmware, support patch and update and may be connected to other buses or networks. Hence, the risk of exploit by rogue software, or other attack on the device is present. Embodiments thus may provide the ability to verify integrity of at least certain code that executes on the components via an external entity.

Figure 3:
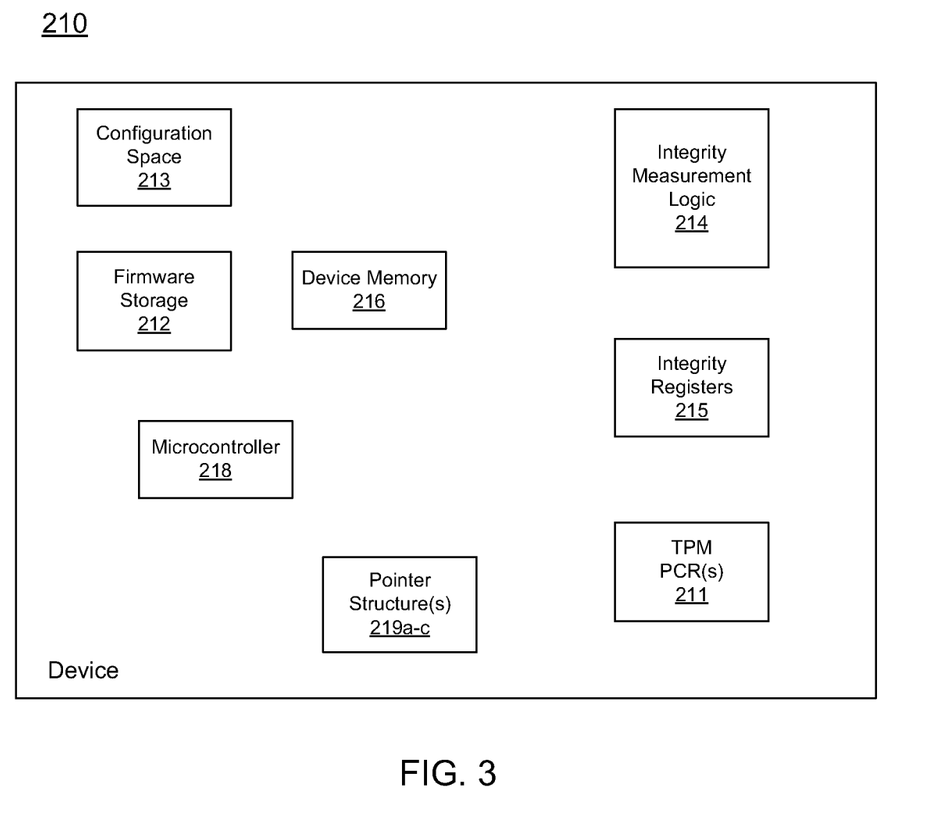
FIG. 3 is a block diagram of a representative device in accordance with one embodiment of the present invention.

Referring now to FIG. 3, shown is a block diagram of a representative device 210, which can generally correspond to any of the devices described above with regard to FIG. 2. Each of devices 210 may include a corresponding firmware image stored in a firmware storage, which may be a non-volatile memory of the device, and a configuration space 213. During execution, the firmware image can be stored in a faster memory such as a static random access memory (SRAM), namely device memory 216. In addition, at least some of the devices can include TPM platform configuration registers (PCRs) 211 to aid in performing integrity analysis in accordance with an embodiment of the present invention. As also seen in FIG. 2, an integrity measurement logic 214 is present, which can include hardware to perform integrity checks on the firmware and/or other code of the device responsive to a trigger received from an external entity. In general, the integrity measurement logic can be an embedded fixed function hardware unit configured to perform integrity analysis in accordance with an embodiment of the present invention. In such embodiments this fixed function unit may only operate responsive to receipt of a request from an external security monitoring agent, e.g., antivirus software. In addition, device 210 can include one or more integrity registers 215 to store measurements made by the integrity measurement logic. In some embodiments, these registers can correspond to the TPM PCRs, while in other embodiments these registers may be a different set of structures. Furthermore, at least one of these registers can be configured to store a status message that includes multiple fields that can be written by the integrity measurement logic to indicate status of various other structures of the device. Specifically, as further seen in FIG. 2, device 210 may include a plurality of pointer structures 219a-c. Such pointer structures may include instruction pointers, interrupt pointers and exception handling pointers. Although described as hardware structures to store these various pointers, understand that in other embodiments such pointers can be stored in a local memory to be accessed, e.g., during an integrity analysis operation to confirm that the various pointers present in such structures do not point to locations outside the measured code.

As further seen, device 210 may include one or more controllers 218 (e.g., microcontrollers) on which the device firmware can run. Controller 218 may operate under firmware control, which can include, in some embodiments microcode according to a reduced instruction set computing (RISC) model or a complex instruction set computing (CISC) model. Controller 218 can further execute various applications and other user-level code, or at least instructions from such code provided to the device by a host processor or other logic. In general though, embodiments may be focused on determining the integrity of the running firmware that executes on controller 218 and which is stored during operation in device memory 216. Although shown with these particular components in the embodiment of FIG. 3, understand that the scope of the present invention is not limited in this regard.

Figure 4:
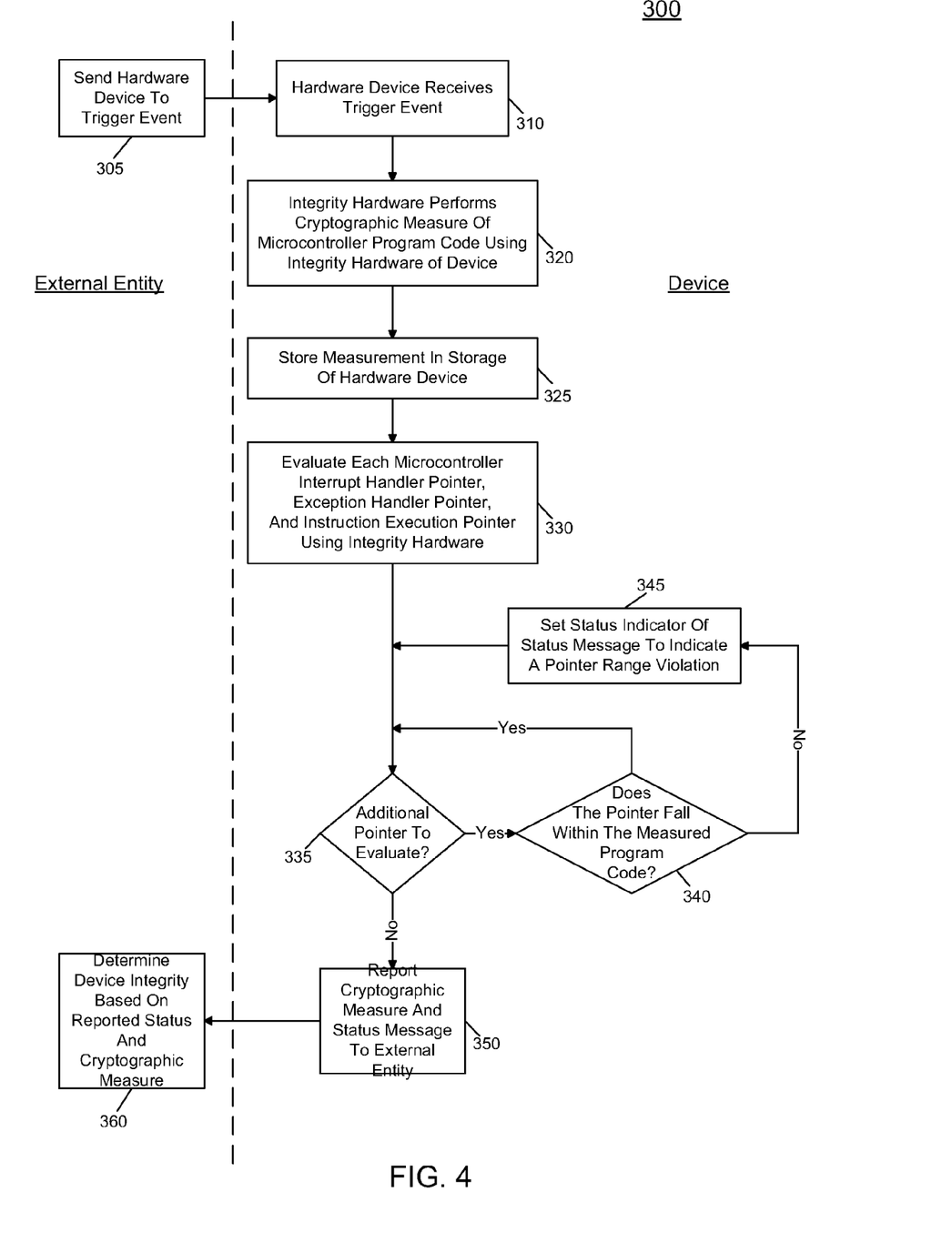
FIG. 4 is a flow diagram illustrating further details of an integrity analysis in accordance with one embodiment of the present invention.

FIG. 4 is a flow diagram illustrating further details of an integrity analysis in accordance with one embodiment of the present invention. As shown in FIG. 4, method 300 can begin by an external entity, e.g., software, sending a trigger to a device to be analyzed (block 305). Although the scope of the present invention is not limited in this regard, in one embodiment a hardware device can expose a trigger to external software (e.g., through PCIe™ memory management input/output (MMIO) register(s)). Note that these registers may be configured by the host system during system initialization. Thus the hardware device can receive this trigger event to initiate various operations to determine the reliability of the software/firmware executing on the hardware device (block 310). As one operation, integrity logic of the device can perform a cryptographic measure (e.g., a hash or a HMAC) of the currently executing/active firmware program code (which can be stored in internal device SRAM) used by the hardware device's internal microcontroller(s) (block 320). The cryptographic measure can then be stored (block 325), e.g., in a storage such as a register of the integrity logic.

In addition to this measure, the hardware device can evaluate and create a report (e.g., including one or more status indicators such as bit flags), namely an additional execution status message to indicate whether the microcontroller's current executing instruction pointer(s), interrupt table pointer(s), and exception handler pointer(s) (as appropriate for the subject microcontroller) respectively, refer to locations that fall within the address range(s) of the firmware program code that was subject to the cryptographic measure (block 330). As seen, these pointer evaluations may loop through diamonds 335 and 340 and block 345.

Upon completion of the pointer analysis, control passes to block 350, where the cryptographic measure value and execution status message can be reported to the external entity software (e.g., through subsequent PCI/PCI-express MMIO register(s) reads by external software) as a response to the initial trigger. Of course, in different embodiments additional or different operations may be performed in the hardware device responsive to the external software request. Further, note that the integrity analysis can be performed on device initialization and/or at other times during system operation, such as whenever an antivirus software scan is run.

Then control passes to block 360, where the external software can determine device integrity based on this information. As an example usage scenario, it is the responsibility of the external software to, upon receipt of the measurement information, analyze the measurement information received. As an example, the software may compare a resulting cryptographic measure hash value against a list of known/trusted firmware hash values to determine whether the hash matches one of the values. Further, the software can ensure that none of the execution status flags indicate that the hardware device internal microcontroller is referencing/using program code that was not subject to the cryptographic measure. Note that the number and nature of the execution status flags may vary from microcontroller to microcontroller. As examples, an embodiment may choose to use one single execution status flag to represent a violation by one or more pointers in aggregate, or dedicate one execution status flag to each pointer for more granular execution status reporting.

If the external software determines a measured hash match, and determines that the execution status flags are proper, the external software can accept the integrity of the firmware executing on the hardware device. Thus the external software can indicate with at least a reasonable assurance that the executing firmware in the hardware device has not been compromised or otherwise had its integrity affected. And thus the hardware or software can proceed to perform security-sensitive operations after assuring the system is in a secure state (e.g., integrity has been verified). The execution status flags may indicate if any microcontroller execution pointer (e.g., interrupt table pointer, exception pointer, executing instruction pointer) refers to code that is not subject to the measurement. In this way, malicious program code can be prevented from leaving the original firmware program code unaltered and instead using substitute malicious code present in an unmeasured program data area of the SRAM.

In various embodiments, the cryptographic measure performed in the hardware device may only measure static firmware program code present in the hardware device's microcontroller(s) SRAM. However, the measure may not include firmware program data also present in SRAM, as measuring runtime program data can result in uncorrelated/non-deterministic measure values.

In various embodiments, the integrity checking performed responsive to an external software request can be entirely implemented and serviced by hardware, and in no way be influenced in operation or have the result directly affected by the firmware executing in the hardware device's microcontroller. In this way, a malicious firmware can be prevented from affecting the reported measure of itself In other embodiments however, a microcontroller itself may execute code to measure its own SRAM contents. However, for this regime, various prerequisites may be present. For example, the measurement program code can be present in a read only memory (ROM) region or another region that cannot be modified by the microcontroller during an untrusted state. In addition, the microcontroller can be put into a trusted state, regardless of current (untrusted) state, that guarantees correct and accurate execution of the measurement program code in the ROM which can vary depending on the type of microcontroller. For example, in some embodiments, this trusted state may be a system management mode (SMM), an authenticated code module (ACM) or so forth. Further, the measurement value, after being reported by the microcontroller in the trusted state using the measurement program code, cannot be changed or overwritten by the microcontroller once the microcontroller resumes/returns to the previous untrusted state. Overall the "trusted" state can be generally defined as an operational process of the microcontroller that lets it halt current firmware execution and switch to execution of a different set of firmware, where the second set of firmware operates completely independent of the influence of the first firmware. The first set of firmware is recognized as "untrusted" and the second set of firmware is recognized as "trusted". In one embodiment, the trusted state may be entered by ceasing the execution of "untrusted" firmware (i.e., the thing to be measured), saving all microcontroller state related to the execution of the untrusted firmware, and resetting/reinitializing all microcontroller state to fresh (trusted) values.

In various embodiments, only the cryptographic hash of program code SRAM contents and an execution status flag can be communicated between the hardware device and the external software, in order to reduce any unintended side-channel information disclosure scenarios of the detailed operational state of the hardware device's microcontroller.

Thus according to various embodiments, unnecessary device resets can be avoided and a higher level of visibility and assurance that firmware program code running within a hardware device has not been altered can be achieved, leading to a more trusted computing ecosystem.

Figure 5:
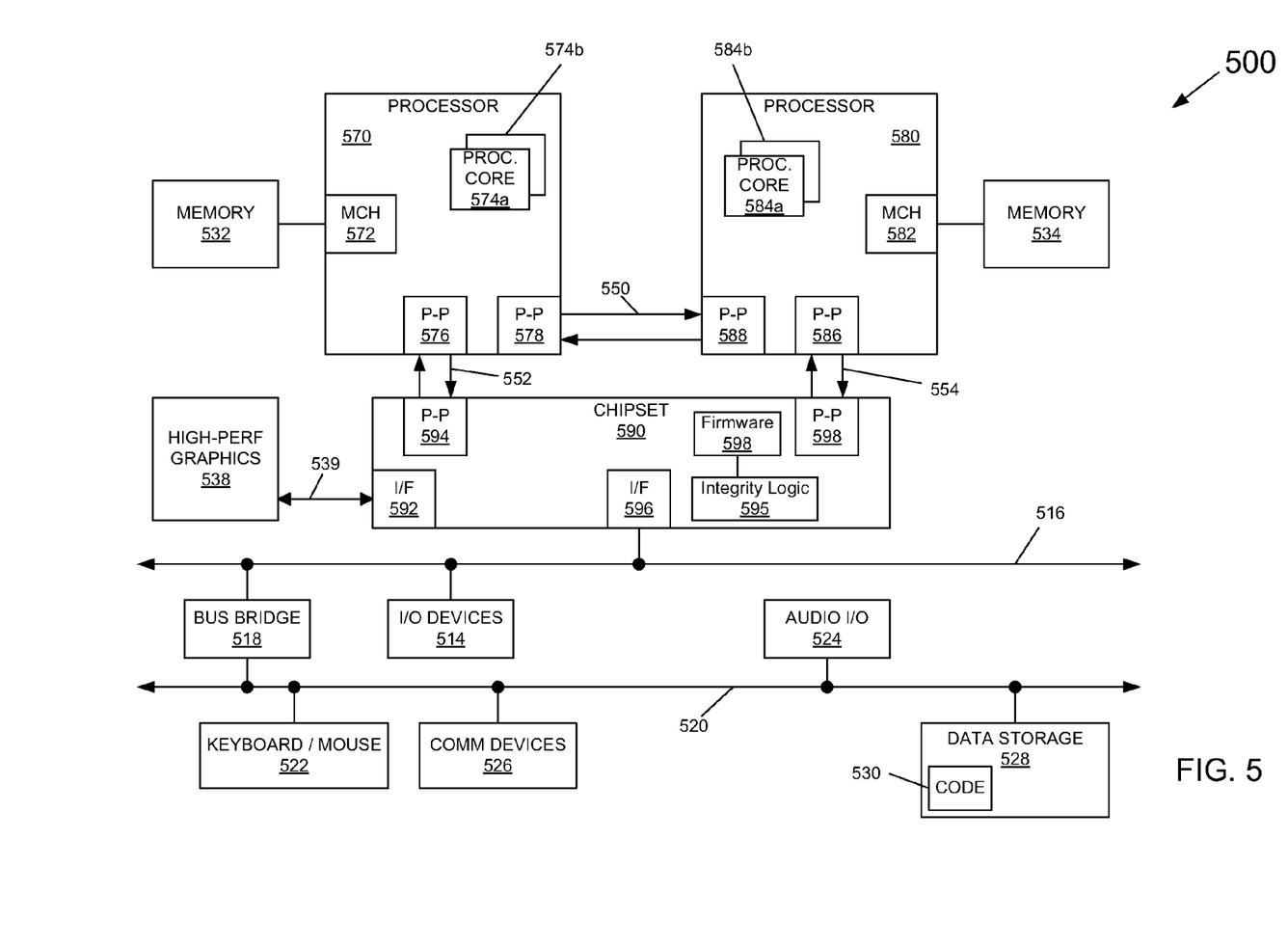
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b), although potentially many more cores may be present in the processors. Such processors may execute antivirus software that can communicate with dedicated integrity hardware present in one or more of the additional components of system 500.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 5, chipset 590 includes P-P interfaces 594 and 598. As one example, chipset 590 can include integrity logic 595 to measure integrity of the firmware stored in firmware storage 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 5, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, e.g., to perform device firmware security operations in accordance with an embodiment of the present invention. Further, an audio I/O 524 may be coupled to second bus 520.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving an integrity request in a device of a computer system from a monitoring entity external to the device;
performing a measurement of firmware of the device stored in a firmware storage of the device using an integrity measurement logic of the device and storing the measurement in a storage of the device;

analyzing a plurality of hardware pointer structures of the device to determine whether a potential security violation exists based on one or more pointers stored in the plurality of hardware pointer structures, including identifying a violation in a first field of a status storage of the device if a first pointer of one of the hardware pointer structures points to a location outside of the measured firmware; and sending the measurement and a status report regarding the analysis to the monitoring entity, to enable the monitoring entity to determine if a potential pointer violation is indicated based on a pointer of the plurality of pointer structures extending beyond a region of the measured firmware.

2. The method of claim 1, wherein the analyzing includes determining whether any of the one or more pointers stored in the plurality of hardware pointer structures point to a location outside of the measured firmware.

3. The method of claim 1, further comprising sending the measurement from the storage of the device to the monitoring entity to enable the monitoring entity to determine if the measurement matches an entry in a whitelist for the device, the whitelist including a plurality of entries each storing a measurement for a firmware of a corresponding device.

4. The method of claim 3, wherein the monitoring entity is to report an integrity violation if the measurement does not match an entry in the whitelist.

5. The method of claim 3, wherein the monitoring entity is to enable operation of the device if the measurement matches an entry in the whitelist.

6. The method of claim 1, wherein performing the measurement includes performing a cryptographic measure of the firmware stored in the firmware storage of the device using the integrity measurement logic that executes an integrity code block.

7. The method of claim 1, wherein the monitoring entity is to report an integrity violation if the potential pointer violation is indicated.

8. The method of claim 1, further comprising receiving the integrity request from the monitoring entity external to the computer system.

9. A device comprising:
a microcontroller to execute device firmware;
a non-volatile storage to store the device firmware;
a plurality of hardware pointer structures including a first hardware pointer structure to store at least one instruction pointer, a second hardware pointer structure to store at least one interrupt handler pointer, and a third hardware pointer structure to store at least one exception handler pointer; and
integrity logic to receive an integrity validation request from an external security monitoring agent, measure the device firmware and store a cryptographic measure of the device firmware in a second storage of the device, determine whether any of the plurality of hardware pointer structures includes a pointer to point to a location outside of the measured device firmware and if so set a corresponding indicator of a status message, and report the cryptographic measure and the status message to the external security monitoring agent, to enable the external security monitoring agent to determine if a potential pointer violation is indicated based on a pointer of the plurality of hardware pointer structures extending beyond a region of the measured firmware.

10. The device of claim 9, wherein the device comprises a peripheral device coupled to a peripheral controller hub (PCH) of a computer system, the PCH coupled to a processor of the computer system, wherein the external security monitoring agent is antivirus software that is to execute on the processor.

11. The device of claim 9, wherein the device comprises a peripheral device of a first computer system and the external security monitoring agent comprises software to execute on a processor of a second computer system remotely coupled to the first computer system.

12. The device of claim 11, wherein the integrity logic comprises a fixed function unit to operate only responsive to receipt of the integrity validation request from the external security monitoring agent.

13. The device of claim 9, wherein the microcontroller comprises the integrity logic, wherein the microcontroller is to be placed into a trusted state responsive to the integrity validation request and prior to execution of an integrity code block separate from the device firmware, and to exit the trusted state after the device firmware measurement and pointer structure determination.

14. A system comprising:
a processor to execute security software; and
a peripheral device coupled to the processor, the peripheral device including a controller to execute a firmware image, a non-volatile storage to store the firmware image, and integrity logic to receive an integrity validation request from the security software and to measure the firmware image to generate a cryptographic measure of the firmware image, and report the cryptographic measure to the security software, wherein the peripheral device further comprises a plurality of hardware pointer structures including:
a first hardware pointer structure to store at least one instruction pointer;
a second hardware pointer structure to store at least one interrupt handler pointer; and
a third hardware pointer structure to store at least one exception handler pointer, and the peripheral device is to access the plurality of hardware pointer structures responsive to the integrity validation request to determine whether a potential security violation exists, and if so to report the potential security violation to the security software, and the security software is to report an integrity violation if the potential security violation is reported, wherein the potential security violation indicates that at least one of the plurality of hardware pointer structures includes a pointer that points to a location outside of the firmware image.

15. The system of claim 14, wherein the security software is to report an integrity violation if the cryptographic measure does not match an entry in a whitelist, and otherwise enable operation of the peripheral device if the cryptographic measure matches an entry in the whitelist.

16. The system of claim 14, wherein the peripheral device is coupled to a peripheral controller hub (PCH) of the system.

* * * * *